3,475,433
SELECTED 13,14-DIAZATRICYCLO-[6.4.1.1²,⁷] TETRADECANES AND DIAZATRICYCLO [6.4.1.1²,⁷] TETRADECATETRAENES AND THEIR PREPARATION
Alexander L. Johnson, Wilmington, Del., assignor to E. I. du Pont de Nemours and Company, Wilmington, Del., a corporation of Delaware
No Drawing. Filed Feb. 25, 1966, Ser. No. 529,961
Int. Cl. C07d 51/72; G02b 5/22
U.S. Cl. 260—268                    16 Claims

ABSTRACT OF THE DISCLOSURE

Described and claimed are selected 13,14-diazatricyclo-[6.4.1.1²,⁷]tetradecanes and diazatricyclo[6.4.1.1²,⁷]tetradecatetraenes and their preparation. Tetraenes may be prepared by the thermal rearrangement of 1H-azepine-1-carbonitrile dimers and may be hydrogenated to give the tetradecanes. The tetraenes and tetradecanes are all useful as adhesives. The tetraenes additionally are useful as ultraviolet light absorbers.

---

This invention relates to, and has as its principal objects provision of, compounds having a novel tricyclic heterocyclic ring system, i.e., certain 13,14-diazatricyclo-[6.4.1.1²,⁷]tetradecanes and tetraenes, and processes for the preparation of the same.

In the Marsh U.S. Patent 3,268,512 of Aug. 23, 1966, the entire specification of which is incorporated herein by reference, there are described and claimed dimeric azepines of the general formula

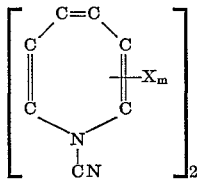

(I)    1H-azepine-1-carbonitrile dimers

For the purposes of this invention, X represents certain substituents as defined more precisely below and $m$ is a cardinal number in the range 0–6, inclusive, denoting the number of valences on the depicted carbons filled by substituents X. When $m$ is less than 6, the valences on carbon up to a total of 6 not satisfied by substituents are satisfied by hydrogen. When $m$ is greater than 1, the X's need not be the same. A substituent can, of course, be located on any carbon in the ring.

The exact structure of the dimers of the Marsh patent is not precisely known, but, in the case where no substituent is present ($m=0$), it is believed to involve the asymmetrical heterocyclic skeleton:

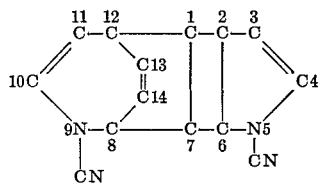

(Ia)   5,9-diazatetracyclo[5.5.2⁸,¹².0.0²,⁶]tetradeca-3,10,13-triene-5,9-dicarbonitrile The principal evidence for the Ia structure is found in the ultraviolet, infrared, and NMR absorption spectra and in ready reaction with Benedict's and Tollens' reagents, indicating presence of C=C in an unsymmetrical environment and of

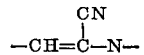

groups. The dimeric N-cyanoazepines are readily soluble, physically stable, generally colorless compounds solid at normal temperatures and melting near 200° C.

As typical of the dimers of the Marsh patent, there may be considered the unsubstituted N-cyanoazepine dimer (Formula I, $m=0$; see Example 2 of the aforementioned Marsh patent), which is soluble in common solvents, melts at 215° C. with decomposition, and has the following spectral characteristics:

IR:   $\nu_{max.}^{KBr}$ 1670 cm.⁻¹ (very intense), attributable to C=C in an unsymmetrical environment.
UV:   $\lambda_{max.}^{CH_3OH}$ 241 mμ ($\epsilon$=5800), attributable to two

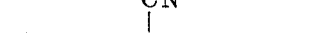

—CH=CH—N—chromophores.
NMR: (CD₃)₂SO solution.
    $\tau$=3.98 (m.), 6 protons; 5.07 (m.), 2 protons;
    5.55 (m.), 2 protons; 6.24 (m.), 2 protons.

Attempts to hydrolyze or reduce this dimer lead to intractable mixtures, no products being formed that correspond to those obtained from the corresponding diazatricyclotetraene.

In accordance with the present invention, it has been found that, when heated near their melting points in a homogeneously diluted state, which may be a liquid or solid solution or a liquid, solid or liquid-solid mixture or dispersion, the N-cyanoazepine dimers of Formula I rearrange to more stable and novel diacyclotetraenes. An equation for the reaction taking place can be written as:

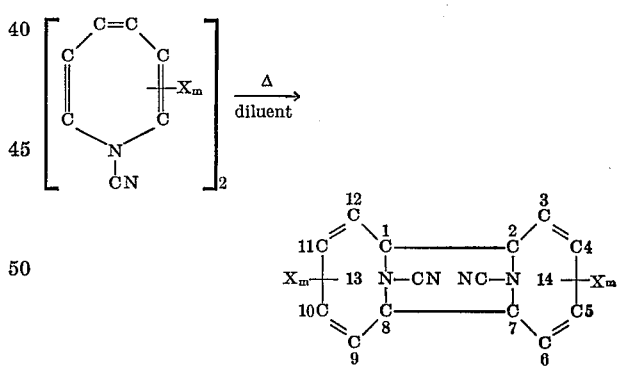

(IIa)   13,14-diazatricyclo[6.4.1.1²,⁷]tetradeca-3,5,9,11-tetraene-13,14-dicarbonitriles In this equation, $m$ represents a number from 0–6 being a maximum of 2 when X is nitro, while the X's, alike or different, are selected from the group consisting of fluorine, chlorine, cyano, nitro, fluoro- and chloroalkyl of up to 8 carbons and alkoxycarbonyl of up to 9 carbons. Preferably, $m$ is 0 except when X is fluorine and then, preferably, it is 1, 2, or 6. It will be understood that all valences not obviously satisfied by C, N, or X are satisfied by H.

It may be noted that Formula II can be written to show the trans (IIb) and cis (IIc) stereoisomeric forms,

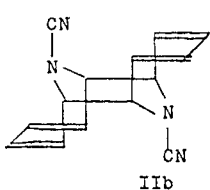
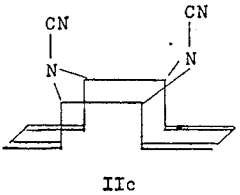

IIb                                    IIc

For the sake of simplicity, formulae of the type of IIa rather than of IIb or IIc will be generally adhered to throughout this specification.

The dicarbonitriles of Formula IIa are readily prepared by mixing the corresponding precursor of Formula I with the chosen inert diluent, generally in the weight ratio of about 1:4 to 1:50, heating to the requisite temperature, generally in the range 175° to 300° C., for 5–100 minutes or so, and recovering the desired product from the diluent by methods well understood in the art, e.g., by dissolution of either product or diluent in appropriate solvents such as acetonitrile (for product), benzene (for naphthalene as diluent) or water (for salt as diluent). Any inert liquid or solid substance stable in the rearrangement temperature range can serve as a diluent. Examples of such diluents are naphthalene, silica sand, sodium chloride, palladium-on-charcoal, and selenium. If no diluent is used, however, heating the N-cyanoazepine dimer near its melting point causes vigorous decomposition to a degraded charred mass from which a recognizable product cannot be obtained. The degraded mass may contain some of the rearranged material, but separation of the latter would be impractical.

Compounds of Formula IIa are easily transformed to various derivatives which also form part of the invention. Thus, the cyano groups in the 13- and 14-positions can be hydrolyzed by well-known methods to yield the hydrolysis products. In addition, the double bonds can be hydrogenated to give the corresponding saturated compound either before or after the hydrolysis. All of the products can, of course, undergo typical class reactions to yield additional compounds. The formulae of the novel compounds of the invention can thus be written as II and III below, II including IIa (above) where R=CN:

II

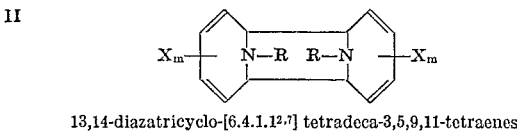

13,14-diazatricyclo-[6.4.1.1$^{2,7}$] tetradeca-3,5,9,11-tetraenes and

III

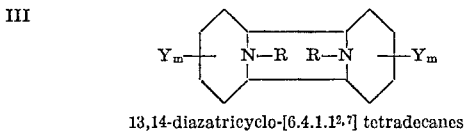

13,14-diazatricyclo-[6.4.1.1$^{2,7}$] tetradecanes

In these formulae X and $m$ are as above; R is cyano, hydrogen, nitroso [—NO], alkyl [—R' of 1-8 carbons], carbamoyl $$[-\overset{O}{\underset{\|}{C}}NH_2], \text{alkylcarbamoyl} [-\overset{O}{\underset{\|}{C}}NR'], \text{arylcarbamoyl} [-\overset{O}{\underset{\|}{C}}NHAr]$$

—Ar being aryl hydrocarbon of 6-10 carbons], alkylthiocarbamoyl $$[-\overset{S}{\underset{\|}{C}}NHR'], \text{arylthiocarbamoyl} [-\overset{S}{\underset{\|}{C}}NHAr], \text{alkylcarbonyl} [-\overset{O}{\underset{\|}{C}}R'],$$

$$\text{arylcarbonyl} [-\overset{O}{\underset{\|}{C}}Ar], \text{alkoxycarbonyl} [-\overset{O}{\underset{\|}{C}}OR'], \text{aryloxycarbonyl}$$

$$[-\overset{O}{\underset{\|}{C}}OAr]$$

or aralkyl [—R'Ar]; and Y is fluorine, chlorine, fluoro- or chloroalkyl of up to 8 carbons, or alkoxycarbonyl. It will be noted that Y is of somewhat lesser scope than X because of the failure of certain radicals to survive the catalytic hydrogenation requisite to the method of preparation.

The hydrolysis of compounds of Formula IIa can be readily carried out in 50% sulfuric acid, for example. The products are the corresponding bis (ureas) IId and diamines IIe (see below). Compounds IId result from short periods of treatment, specifically up to six hours, while compounds IIe are produced by more extensive heating, specifically up to 20 hours. Compounds IId may be converted to the usual secondary amine derivatives or isolated and purified in the form of amine salts, e.g., the hydrochlorides. Schematic equations for the hydrolysis reactions taking place may be written as follows:

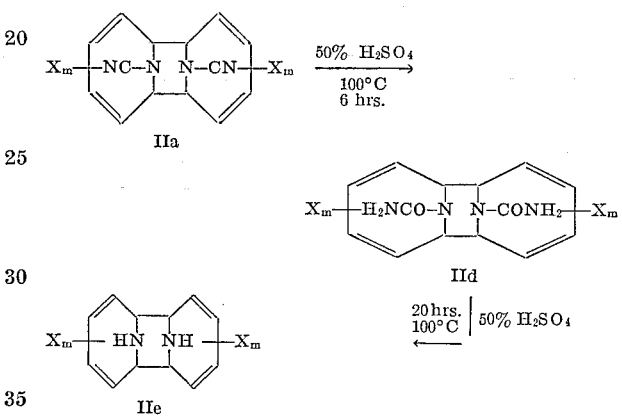

The diamines (Formula IIe) can be readily converted to compounds of Formula II wherein R is nitroso, alkyl, aralkyl, alkyl- or arylcarbonyl, alkoxy- or aryloxycarbonyl, alkyl- or arylcarbamoyl, or alkyl- or arylthiocarbamoyl. The nitroso derivatives are obtained readily by usual amine nitrosation procedures, e.g., with sodium nitrite and hydrochloric acid (cf. Example 22). The derivatives where R is alkyl or aralkyl can be obtained by well-known alkylation procedures involving reaction of the diamines with corresponding halides, e.g., benzyl iodide (cf. Example 17). Reaction of the diamines with alkyl- or arylcarboxylic acid halides or anhydrides by conventional acylation procedures (cf. Examples 7 and 8) yields the derivatives in which R is alkyl- or arylcarbonyl; and acylation with alkyl or aryl haloformates yields the derivatives in which R is alkoxy- or aryloxycarbonyl (cf. Example 24). Similarly, by well-known methods, reactions of the diamines with alkyl or aryl isocyanates or isothiocyanates yield the compounds of Formula II in which R is correspondingly alkyl- or arylcarbamoyl or alkyl- or arylthiocarbamoyl, respectively (cf. Examples 9 and 14). Of course, the diamines of Formula IIe also form the usual hydrohalide salts such as the hydrochlorides or hydrobromides, which can be isolated from aqueous solution (cf. Examples 10 and 12).

The new 13,14 - diazatricyclo[6.4.1.1$^{2,7}$]tetradeca-3,5,9,11-tetraenes of this invention are chemically stable, colorless solids which melt in the range 100–400° C. with decomposition. Their highly symmetrical "cisoid diene" structure is indicated by the nature of their infrared, ultraviolet, and NMR spectra (cf. Example 2), and of their Raman spectra (cf. Examples 5 and 17). Although they melt with "decomposition," the products of melt-decomposition are not degraded and hence are useful adhesives. The compounds do not reduce Tollens' and Benedict's reagents, and they are almost completely insoluble in most common solvents.

Hydrogenation of some (IIe) of the compounds II in aqueous hydrochloric acid over platinum catalyst at pressures of 1–5 atm. produce the corresponding octahydro-compounds IIIb in the form of their hydrochlorides.

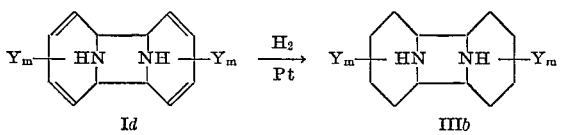

Compounds IIIb are colorless, pleasant-smelling materials which melt between 0–300° C. and show the usual secondary diamine properties.

The saturated diamines (Formula IIIb) can be readily converted to compounds of Formula III wherein R is cyano, carbamoyl, nitroso, alkyl, aralkyl, alkyl- or arylcarbonyl, alkoxy- or aryloxycarbonyl, alkyl- or arylcarbamoyl, or alkyl- or arylthiocarbamoyl. The derivatives where R is cyano can be obtained from the diamines by reaction with a cyanogen halide (Migrdichian "The Chemistry of Organic Cyanogen Compounds," ACS Monograph No. 105, p. 103) or by N-halogenation with alkali hypohalite followed by reaction with alkali cyanide (Taylor and baker, Sidgwick's "Organic Chemistry of Nitrogen," Oxford University Press, 1945, pp. 40 and 329; Migrdichian, loc. cit., p. 132). The saturated cyano derivatives in turn can be hydrolyzed to the carbamoyl derivatives in the same fashion as the unsaturated cyano compounds of Formula IIa (cf. Examples 3 and 4). The nitroso derivatives are obtained conventionally by nitrosation (cf. Example 23). The derivatives where R is alkyl or arylalkyl can be obtained from the diamines and corresponding halides, e.g., amyl iodide, by well-known alkylation procedures (cf. Example 18). The diamines and alkyl- or arylcarboxylic acid halides or anhydrides under conventional acylation conditions (cf. Example 13) yield the derivatives in which R is alkyl- or arylcarbonyl; and in the same fashion acylation with alkyl or aryl chloroformates yields compounds of Formula III in which R is alkoxy- or aryloxycarbonyl (cf. Example 24). Similarly, by well-known methods, reactions of the diamines with alkyl or aryl isocyanates or isothiocyanates yield the compounds of Formula III in which R is correspondingly alkyl- or arylcarbamoyl, or alkyl- or arylthiocarbamoyl, respectively (cf. Examples 15 and 16). The saturated diamines also form the usual hydrohalide salts (cf. Examples 10 and 12).

There follow some nonlimiting examples illustrating the invention in more detail. Example 1 represents a preferred method for preparing the dicyano compounds employed as precursors for the other compounds of the invention.

EXAMPLE 1.—13,14 - DIAZATRICYCLO[6.4.1.1$^{2,7}$] TETRDECA - 3,5,9,11 - TETRAENE - 13,14 - DICARBONITRILE

Formula IIa: $m=0$ (or Formula II where R=CN and $m=0$)

A 5-liter, 4-neck Morton flask equipped with heating mantle, mechanical stirrer, thermometer and two reflux condensers was charged with practical grade naphthalene (1000 g.). The thermometer bulb was arranged to dip into the naphthalene, and the condensers were heated with hot water. The apparatus was flushed with nitrogen and the temperature of the naphthalene was raised to 140° C., the stirrer being started when most of the naphthalene had melted (90° C.). Powdered dimer I ($m=0$; 200 g.) was added in 10 minutes through one condenser to the rapidly stirred naphthalene at 140° C. The dimer dissolved rapidly and heating was continued until the temperature reached 190° C., when a slightly exothermic reaction began and compound IIa ($m=0$) started to precipitate. The temperature was maintained at 210° C. for 20 minutes, and then the mixture was allowed to cool with stirring to a temperature of 100° C., when it was diluted with 2500 ml. of benzene. When the mixture had cooled to 60° C., it was filtered and the residue was washed thoroughly with 1250 ml. of benzene and air-dried. The yield of pale brown crystalline 13,14-diazatricyclo[6.4.1.1$^{2,7}$]tetradeca - 3,5,9,11 - tetraene - 13,14-dicarbonitrile was 138 g. (69%) of analytically pure material. The color was removed by continuous chromatography over Florasil® with dichloromethane as the eluant.

EXAMPLE 2.—13,14 - DIAZATRICYCLO[6.4.1.1$^{2,7}$] TETRADECA - 3,5,9,11 - TETRAENE - 13,14 - DICARBONITRILE (A) 1H-azepine-1-carbonitrile dimer (Formula I, $m=0$; 40.0 g.) was mixed with 100-mesh silica sand (1200 g.) and fed into the hopper of an inclined stainless steel auger reactor which had been preheated electrically for three hours at a jacket temperature of 250° C. The mixture was passed through the reactor at such a rate that a given sample had a contact time of 10 minutes. The brown product was extracted in a Soxhlet apparatus with acetonitrile to yield 23.95 g. (60%) of crude 13,14-diazatricyclo[6.4.1.1$^{2,7}$]tetraene-13,14-dicarbonitrile as a brown powder.

One half-gram of the crude product was purified by three recrystallizations from dichlorotetrafluoroacetone hydrate (3 ml.). The fine white powder was dried at 100° C./0.2 mm. (0.10 g.), M.P. >395° C. dec. Eleven grams of the crude product was purified more satisfactorily by continuous chromatography over a 1″ layer of Florisil® using dichloromethane as the eluant. Pure 13,14-diazatricyclo[6.4.1.1$^{2,7}$]tetradeca - 3,5,9,11 - tetraene-13,14-dicarbonitrile was recovered in 60% yield (6.62 g.)

(B) In a further experiment, a mixture of 37.0 g. of 1H-azepine-1-carbonitrile dimer and 1100 g. of sodium chloride was heated in the same apparatus. The sodium chloride was washed out with water and the residue, purified by continuous chromatography over Florisil®, yielded 15.84 g. (43%) of pure 13,14-diazatricyclo[6.4.1.1$^{2,7}$]tetradeca-3,5,9,11-tetraene-13,14-dicarbonitrile.

Analysis.—Calcd. for $C_{14}H_{12}N_4$: C, 71.16; H, 5.12; N, 23.72; M.W., 236.27. Found: C, 71.03, 71.36; H, 5.14, 5.13; N, 23.77, 23.74; M.W., 236 (mass spectrum).

IR: $\nu_{max.}^{KBr}$ 3040cm.$^{-1}$ (w.) (CH=CH); 2210 cm.$^{-1}$ (s.) (C≡N); 1660, 1625 cm$^{-1}$ (w.) (C=C)

UV: $\lambda_{max.}^{CH_3CN}$ 237 m$\mu$ ($\epsilon$ 16,300); 230 m$\mu$ ($\epsilon$ 15,150) (shoulder)

MS: m./e. 236 (parent), 208, 195, 194, 193, 181, 169, 168, 167, 144, 119, 118 (base peak, ½ parent), 69, 57, 55

NMR ($CF_2ClCOCF_2Cl \cdot D_2O$):
$\tau=3.61$ (m.) 8 CH=CH protons; 5.96 (d.) 4 CH—N protons EXAMPLE 3.—13,14 - BIS(CARBAMOYL) - 13,14-DIAZATRICYCLO[6.4.1.1$^{2,7}$]TETRADECA-3,5,9,11-TETRANE Formula II: 
$R=-\overset{O}{\underset{\|}{C}}NH_2$; $m=0$ 13,14 - diazatricyclo[6.4.1.1$^{2,7}$]tetradeca - 3,5,9,11-tetraene-13,14-dicarbonitrile (5.6 g.; see Examples 1 and 2) and 50% sulfuric acid (50 ml.) were stirred together in a 100-ml. 3-neck flask under nitrogen and heated at a bath temperature of 100° C. for six hours. At the end of this time, almost all of the solid had dissolved. The solution was cooled and the insoluble product (5.25 g., 81%) filtered and washed with water. Two recrystallizations of 4.48 g. of this product from aqueous dichlorotetrafluoroacetone hydrate (20 ml.) with Darco-G60® treatment yielded 2.40 g. (53% recovery) of pure bis(urea), 13,14 - bis(carbamoyl) - 13,14 - diazatricyclo[6.4.1.1$^{2,7}$]tetradeca-3,5,9,11-tetraene, M.P. >295° C. dec.

*Analysis.*—Calcd. for $C_{14}H_{16}N_4O_2$: C, 61.75; H, 5.92; N, 20.58; M.W., 272.30. Found: C, 62.08, 62.02; H, 6.17, 5.98; N, 20.01; M.W., 272 (mass spectrum).

IR: $\nu_{max.}^{KBr}$ 3420, 3300, 3160 cm.$^{-1}$ ($NH_2$); 3000 cm.$^{-1}$ (CH=CH); 1650, 1585 cm.$^{-1}$ ($NCONH_2$)
UV: $\lambda_{max.}^{50\% H_2SO_4}$ 234 m$\mu$ ($\epsilon$ 9450)
NMR ($CF_2ClCOCF_2Cl \cdot D_2O$): $\tau$=3.96 (broad) 8 CH=CH protons; 5.32 (broad) 4 $NH_2$ exchange; protons +4 CH—N; protons+solvent
MS m./e.: 272 (parent), 229, 185, 169, 168, 136 (base peak, ½ parent), 123, 118, 97, 93, 87, 85, 83, 81, 78, 71, 69, 57, 56, 55, 43, 31, 29, 28, 27, 18.

EXAMPLE 4.—13,14 - BIS(CARBAMOYL) - 13,14-DIAZATRICYCLO[6.4.1.1$^{2,7}$]TETRADECA-3,5,9,11-TETRAENE

A mixture of 13,14-diazatricyclo[6.4.1.1$^{2,7}$]tetradeca-3,5,9,11-tetraene-13,14-dicarbonitrile (3.09 g.), para-toluenesulfonic acid monohydrate (9.97 g.) and water (5 ml.) was stirred together and heated at 110° C. for 15 minutes. After cooling, the mixture was treated with water, basified with 25% sodium hydroxide and filtered. The insoluble residue (3.35 g., 90%) was identified as the bis(urea) of Example 3 by infrared spectrum.

EXAMPLE 5.—13,14 - DIAZATRICYCLO[6.4.1.1$^{2,7}$] TETRADECA - 3,5,9,11 - TETRAENE FORMULA II: R=H; m=0

(A) Pure 13,14 - diazatricyclo[6.4.1.1$^{2,7}$]tetradeca-3,5,9,11-tetraene-13,14-dicarbonitrile (3.90 g.) and 50% sulfuric acid (50 ml.) were sealed in a polymer tube and heated at 100° for 20 hours. After cooling to 0° C., the contents of the tube were diluted with 50 ml. of water and filtered free of 0.32 g. of the bis(urea), 13,14-bis(carbamoyl) - 13,14 - diazatricyclo[6.4.1.1$^{2,7}$]tetradeca-3,5,9,11-tetraene. The aqueous mother liquors were neutralized with solid sodium carbonate and adjusted to pH 8 with sodium bicarbonate before continuous extraction with chloroform. The crude diamine obtained by evaporation of the dried extracts weighed 1.86 g. (60%). Recrystallization of 1.30 g. of this product from water with Darco G-60® treatment gave 0.51 g. of almost pure diamine 13,14 - diazatricyclo[6.4.1.1$^{2,7}$]tetradeca-3,5,9,11-tetraene as white crystals, M.P. 142–144° C. A further recrystallization raised the melting point to 145–146.5° C. dec. after drying at 25° C./0.2 mm.

*Analysis.*—Calcd. for $C_{12}H_{14}N_2$: C, 77.38; H, 7.58; N, 15.04; M.W., 186.25. Found: C, 77.33; H, 7.72; N, 15.10, 14.84; M.W., 186 (mass spectrum.

IR: $\nu_{max.}^{KBr}$ 3420, 3290 cm.$^{-1}$ (NH); 3030 cm.$^{-1}$ (CH=CH); 1655, 1620, 1460 cm.$^{-1}$
UV: $\lambda_{max.}^{CH_3CN}$ 240 m$\mu$ ($\epsilon$ 15,800) (shoulder); 234 m$\mu$ ($\epsilon$ 16,400)
NMR ($D_2O$, 80°): $\tau$=3.84 (s.) 8 CH=CH protons; 5.70 (s.) 2 NH exchange protons; 6.33 (d.) 4 CH—N protons
MS: m./e. 186 (parent), 94, 93, (base peak, ½ parent), 80, 67, 66, 65, 41, 39, 28, 27
Raman=strong band at 1615 cm.$^{-1}$ (B) In a further experiment, 68 g. of 13,14-diazatricyclo[6.4.1.1$^{2,7}$]tetradeca - 3,5,9,11-tetraene-13,14-dicarbonitrile was hydrolyzed in a three-necked flask under nitrogen with 500 ml. of 50% sulfuric acid at 120° C. for 24 hours to give a yield of approximately 45% of 13,14-diazatricyclo[6.4.1.1$^{2,7}$]tetradeca-3,5,9,11-tetraene.

EXAMPLE 6.—13,14-DIAZATRICYCLO[6.4.1.1$^{2,7}$] TETRADECA-3,5,9,11-TETRAENE

Example 5 was substantially repeated with the substitution of para-toluenesulfonic acid for sulfuric acid.

A mixture of 13,14-diazatricyclo[6.4.1.1$^{2,7}$]tetradeca-3,5,9,11 - tetraene - 13,14-dicarbonitrile (3.34 g.), para-toluenesulfonic acid monohydrate (10.78 g.) and water (0.5 ml.) was heated under reflux for two hours. The mixture was then stirred with 20 ml. of water and made alkaline with 25% sodium hydroxide solution. The alkaline mixture was continuously extracted with chloroform for 24 hours to yield 1.20 g. (46%) of the crude diamine of Example 5. Identification was confirmed by mixed melting point and n.m.r. spectrum, using a recrystallized sample, M.P. 144–146° C. dec.

EXAMPLE 7.—13,14 - DIBENZOYL-13,14-DIAZATRICYCLO[6.4.1.1$^{2,7}$]TETRADECA-3,5,9,11-TETRAENE

Formula II:

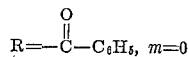

$R = -C(=O)-C_6H_5$, $m=0$

A suspension of 0.25 g. of 13,14 - diazatricyclo[6.4.1.1$^{2,7}$]tetradeca - 3,5,9,11 - tetraene (see Examples 5 and 6) in 5 ml. of 10% sodium hydroxide was shaken with 0.4 ml. of benzoyl chloride for 10 minutes. The precipitate was filtered, washed with water and air-dried (0.42 g., 79%). The crude product was recrystallized from 1:1 chloroform-ethanol (0.179 g.). After several recrystallizations, the benzoyl derivative was obtained as a white crystalline solid, M.P. 310–311° C. dec. after drying at 100° C./0.2 mm.

*Analysis.*—Calcd. for $C_{26}H_{22}N_2O_2$: C, 79.16; H, 5.62; N, 7.10. Found: C, 78.33, 79.87; H, 5.96, 5.44; N, 7.35, 7.21.

IR: $\nu_{max.}^{KBr}$ 3030 cm.$^{-1}$ (CH=CH); 1645 cm.$^{-1}$ ($NCOC_6H_5$); 1495, 1450, 1420, 1360 cm.$^{-1}$ ($C_6H_5$)

UV: $\lambda_{max.}^{CH_2Cl_2}$ 235 m$\mu$ ($\epsilon$ 21,300)

EXAMPLE 8.—13,14 - DI - PARA-BROMOBENZOYL-13,14 - DIAZATRICYCLO[6.4.1.1$^{2,7}$]TETRADECA-3,5,9,11-TETRAENE

Formula II:

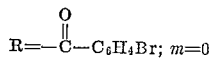

$R = -C(=O)-C_6H_4Br$; $m=0$

The process of Example 7 was substantially repeated with 87 mg. of 13,14-diazatricyclo[6.4.1.1$^{2,7}$]tetradeca-3,5,9,11-tetraene, 3 ml. of 10% sodium hydroxide and 0.2 ml. of para-bromobenzoyl chloride. The dried precipitate weighed 151 mg. (60%). Recrystallization from a mixture of 2 ml. of dichlorotetrafluoroacetone hydrate and 1 ml. of water produced the colorless dibenzamide, 13,14 - di - para - bromobenzoyl - 13,14 - diazatricyclo[6.4.1.1$^{2,7}$]tetradeca-3,5,9,11-tetraene, M.P. 322–323° C. dec., after drying at 100° C./0.2 mm.

*Analysis.*—Calcd. for $C_{26}H_{20}N_2O_2Br_2$: C, 56.54; H, 3.65; M.W., 552.27. Found: C, 56.32, 56.76; H, 3.42, 3.92; M.W., 552 (mass spectrum).

IR: $\nu_{max}^{KBr}$ 3040 cm.$^{-1}$ (w.) (CH=CH); 1675, 1630 cm.$^{-1}$ (s.) (NCOC$_6$H$_4$Br); 1590, 1480, 1430 cm.$^{-1}$ (w.) (BrC$_6$H$_4$)

UV: $\lambda_{max}^{CH_3CN}$ 230 m$\mu$ ($\epsilon$ 32,000)

NMR (CF$_2$ClCOCF$_2$Cl·D$_2$O): $\tau$=3.20 (q., J=8c/s) 8 aromatic protons; 5.70 (m.) 8 vinyl protons; 6.85 (m.) 4 CH–N protons MS: m./e. 554, 552, 550 (parents), 278, 277, 276, 275 275 (1/2 parents), 264, 262, 186, 185, 184, 183 (base peak BrC$_6$H$_4$CO), 157, 155, 104, 92, 76, 75, 65, 39

EXAMPLE 9. — 13,14 - BIS(PHENYLTHIOCARBAMOYL)-13,14-DIAZATRICYCLO[6.4.1.1$^{2,7}$] TETRADECA-3,5,9,11-TETRAENE

Formula II:  $R=-\overset{S}{\overset{\|}{C}}-\overset{H}{\overset{|}{N}}-C_6H_5$;  $m=0$ A 50% solution of phenylisothiocyanate (0.8 ml.) was added to a warm solution of 13,14 - diazatricyclo [6.4.1.1$^{2,7}$]tetradeca-3,5,9,11-tetraene (0.26 g.) in ethanol (1 ml.). After brief warming, crystals appeared and the mixture rapidly set to a crystalline mass. The residue was filtered and thoroughly leached with hot ethanol in a Soxhlet apparatus. The insoluble residue was dried at 100° C./0.2 mm., M.P. 211–212° C. dec.

*Analysis.*—Calcd. for C$_{26}$H$_{24}$N$_4$S$_2$: C, 68.39; H, 5.30; N, 12.27; S, 14.05; M.W., 456.616. Found: C, 68.23; H, 5.36; N, 12.05; S, 14.14; M.W.., 456 (mass spectrum).

IR: $\nu_{max}^{KBr}$ 3040 cm.$^{-1}$ (w.) (CH=CH); 1600, 1520, 1510, 1450 cm.$^{-1}$ (m–s.) (C$_6$H$_5$); 1345, 1230 cm.$^{-1}$ (s.) (N–CS–N)

EXAMPLE 10.—13,14-DIAZATRICYCLO[6.4.1.1$^{2,7}$] TETRADECANE DIHYDROCHLORIDE

Formula III: R=H; m=0 (plus 2 HCl)

The unsaturated diamine 13,14-diazatricyclo[6.4.1.1$^{2,7}$] tetradeca-3,5,9,11-tetraene (300 mg.) was dissolved in a mixture of water (10 ml.), methanol (10 ml.) and conc. hydrochloric acid (0.5 ml.) and hydrogenated at 25° C./760 mm. in the presence of 0.5 g. of platinum oxide. The mixture consumed 4 molar equivalents of hydrogen over a period of 5.5 hours. The catalyst was filtered, washed with water, and the filtrate and washings were evaporated to leave 239 mg. (56%) of a white crystalline solid. Two recrystallizations from a mixture of water (3 ml.), acetone (6–10 ml.), and conc. hydrochloric acid (2 drops) gave pure material (65% recovery) as colorless crystals of the saturated diamine hydrochloride, 13,14 - diazatricyclo[6.4.1.1$^{2,7}$]tetradecane dihydrochloride, M.P. >320° C. dec. after drying at 25° C./0.2 mm.

*Analysis.*—Calcd. for C$_{12}$H$_{24}$N$_2$Cl$_2$: C, 53.94; H, 9.06; N, 10.49. Found: C, 53.88, 53.51; H, 8.99, 8.94; N, 9.95, 9.96.

IR: $\nu_{max}^{KBr}$ 2980, 2860 cm.$^{-1}$ (CH); 2750 cm.$^{-1}$ (NH$_2^+$); 1575 cm.$^{-1}$ (NH$_2^+$)

$\nu_{max}^{Nujol}$ 2740, 2700, 2630 (NH$_2^+$)

UV: no $\lambda_{max}^{H_2O}$ >210 m$\mu$

NMR (D$_2$O, 60 mc./s.): $\tau$=5.30 4 exchange protons; 6.00 4 CH—N tertiary protons; 8.10 16 CH$_2$ protons (D$_2$O, 200 mc./s.): $\tau$=5.30 4 exchange protons; 6.11 (d.) 4 CH—N protons; 7.89 (m.) Half of CH$_2$ protons nearest bridgehead; 8.18 (m.) Other half of CH$_2$ protons nearest bridgehead+8 CH$_2$ protons

EXAMPLE 11.—13,14-DIAZATRICYCLO[6.4.1.1$^{2,7}$] TETRADECANE

Formula III:  R=H, m=0

Crude 13,14-diazatricyclo[6.4.1.1$^{2,7}$]tetradecane dihydrochloride (3.60 g.; see Example 10) was dissolved in 50 ml. of water, treated with 4 ml. of 30% sodium hydroxide, cooled to 0° C., and filtered. A small additional amount of material was obtained by continuous extraction of the mother liquors with carbon tetrachloride. The white crystalline product was purified by sublimation at 70° C./0.1 mm. to give pure 13,14 - diazatricyclo [6.4.1.1$^{2,7}$]tetradecane: 2.13 g. (75% yield); M.P. 61–62° C. (sealed capillary).

*Analysis.*—Calcd. for C$_{12}$H$_{22}$N$_2$: C, 74.17; H, 11.41; N, 14.42; M.W., 194.31. Found: C, 74.06, 74.08; H, 11.13; 11.33; N, 14.36, 14.43; M.W., 194 (mass spectrum).

IR: $\nu_{max}^{KBr}$ 3290 cm.$^{-1}$ (w.)(NH); 2900 cm.$^{-1}$ (w.)(CH); 1450 cm.$^{-1}$ (s.)(NH)

$\nu_{max}^{Nujol}$ 3280 cm.$^{-1}$ (w.)(NH)

UV: no $\lambda_{max}^{H_2O}$ >210 m$\mu$

NMR (CCl$_4$:): $\tau$=7.29 (m.) 4 CH—N protons; 8.29 (m.) 16 CH$_2$ protons; 8.50 (s.) 2 NH protons; signals disappeared on shaking with D$_2$O.

MS: m./e. 194 (parent), 138, 124, 122, 110, 108, 99, 98, (1/2 parent+H), 97, 95, 82, 69, 56, 42, 41, 28, 15

EXAMPLE 12.—13,14-DIAZATRICYCLO[6.4.1.1$^{2,7}$] TETRADECANE DIHYDROBROMIDE

Formula III:  R=H, m=0 (plus 2HBr)

The mother liquors from the recrystallization of the saturated diamine 13,14-diazatricyclo[6.4.1.1$^{2,7}$]tetradecane (see Example 11) were acidified with 48% hydrobromic acid, treated with excess acetone and cooled to 0° C. The white precipitate was reprecipitated twice more with aqueous acetone to give the dihydrobromide (63 mg.), M.P. >320° C. dec.

*Analysis.*—Calcd. for C$_{12}$H$_{24}$N$_2$Br$_2$: C, 40.47; H, 6.79; N, 7.78; M.W., 356.16. Found: C, 40.79; 40.71; H, 6.79, 6.94; N, 7.98; M.W., 356 (mass spectrum).

IR: $\nu_{max}^{KBr}$ 2940 cm.$^{-1}$ (w.)(CH); 2820, 2760, 2670 cm$^{-1}$. (w.)(NH$_2^+$); 1570 cm.$^{-1}$ (s.)(NH$_2^+$)

UV: no $\lambda_{max}^{H_2O}$ >210 m$\mu$

NMR (D$_2$O): $\tau$=5.35 (s.) 4 exchange protons; 6.02 (m.) 4 tertiary CH—N protons; 8.18 (m.) 16 CH$_2$ protons

EXAMPLE 13.—13,14-DIBENZOYL-13,14--DIAZATRICYCLO[6.4.1.1$^{2,7}$]TETRADECANE

Formula III:  $R=-\overset{O}{\overset{\|}{C}}-C_6H_5$, $m=0$ 13,14-diazatricyclo[6.4.1.1$^{2,7}$]tetradecane dihydrochloride (0.30 g.; see Example 10) was dissolved in 5 ml. of water and treated successively with 5 ml. of 10% sodium hydroxide and 0.5 ml. of benzoyl chloride. After 5 minutes' shaking, the white precipitate was filtered, washed with water and dried (0.73 g., 100%). Two recrystallizations from hot chloroform produced 0.151 g. of 13,14-dibenzoyl-13,14-diazatricyclo[6.4.1.1$^{2,7}$]tetradecane as white crystals, M.P. 319.5–320.5° C.

*Analysis.*—Calcd. for C$_{26}$H$_{30}$N$_2$O$_2$: C, 77.58; H, 7.51; N, 6.96; M.W., 402.52. Found: C, 76.82; H, 7.52; N, 6.72; M.W., 402 (mass spectrum).

IR: $\nu_{max}^{KBr}$ 3070 cm.$^{-1}$ (w.)(C$_6$H$_5$); 2920, 2860 cm.$^{-1}$ (w.) (CH); 1635 cm.$^{-1}$ (vs.) (NCOC$_6$H$_5$); 1595, 1490 1445, (w.)(C$_6$H$_5$)

NMR (CDCl$_3$):

$\tau$=2.65 (d., J=5 cps) 10 aromatic protons; 5.04 (m.) 2 bridgehead protons; 6.36 (m.) 2 bridgehead protons; 8.33 (m.) 16 methylene protons EXAMPLE 14.—13,14-BIS(PHENYLCARBAMOYL)-13,14 - DIAZATRICYCLO[6.4.1.1$^{2,7}$]TETRADECA - 3,5,9,11-TETRAENE Formula II: 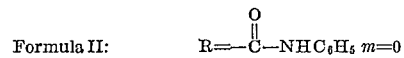 $m=0$ 13,14 - diazatricyclo[6.4.1.1$^{2,7}$]tetradeca-3,5,9,11- tetraene (175 mg.; Examples 5 and 6) was dried at 100° C./0.2 mm. It was slurried with 2 ml. of carbon tetrachloride and treated with 0.30 ml. of phenyl isocyanate, warmed briefly, and then cooled to 0° C. and filtered. The residue (219 mg., 55%) was purified by leaching it with ethanol in a Soxhlet extractor. The pure phenylurea derivative, 13,14-bis(phenylcarbamoyl)-13,14-diazatricyclo [6.4.1.1$^{2,7}$]tetradeca-3,5,9,11-tetraene, was a white powder, M.P. >350° C. dec.

Analysis.—Calcd. for C$_{26}$H$_{24}$N$_4$O$_2$: C, 73.56; H, 5.70; N, 13.20; M.W., 424.28. Found: C, 72.82; H, 6.00; N, 12.97; M.W., 424 (mass spectrum).

IR: $\nu_{max}^{KBr}$ 3220 cm.$^{-1}$(s.)(NH); 3130, 3060, 3030 cm.$^{-1}$(w.) (CH=CH); 1640, 1600, 1530 cm.$^{-1}$(s.)(C$_6$H$_5$NHCO)

EXAMPLE 15.—13,14 - BIS(PHENYLTHIOCARBAMOYL)- 13,14-DIAZATRICYCLO[6.4.1.1$^{2,7}$]TETRADECANE

Formula III: 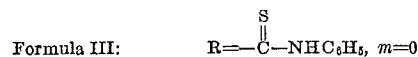 $m=0$

To a solution of 0.51 g. of 13,14-diazatricyclo [6.4.1.1$^{2,7}$]tetradecane (Example 11) in 2 ml. of ethanol was added 1.60 ml. of 50% ethanolic solution of phenyl isothiocyanate. The mixture was warmed for several minutes, then cooled to 0° C. and filtered. The white crystalline precipitate of the crude phenylthiourea derivative (1.02 g., 84%) was purified by prolonged extraction with ethanol in a Soxhlet apparatus to yield a white powder, 13,14 - bis(phenylthiocarbamoyl) - 12,14 - diazatricyclo [6.4.1.1$^{2,7}$]tetradecane, M.P. 289–289.5° C. dec.

Analysis.—Calcd. for C$_{26}$H$_{32}$N$_4$S$_2$: C, 67.20; H, 6.94; N, 12.06; M.W., 464.68. Found: C, 67.35, 67.30; H, 7.04, 7.02; N, 11.83, 11.84; M.W., 464 (mass spectrum).

IR: $\nu_{max}^{KBr}$ 3280 cm.$^{-1}$ (m.) (NH); 3070 cm.$^{-1}$ (w.) (C$_6$H$_5$); 1605, 1505, 1450, (m.-s.) (C$_6$H$_5$NHCS)

UV: $\lambda_{max.}^{C_2H_5OH}$ 259 m$\mu$ ($\epsilon$=36,600)

EXAMPLE 16.—13,14 - BIS(PHENYLCARBAMOYL)-13,14-DIAZATRICYCLO-[6.4.1.1$^{2,7}$]TETRADECANE

Formula III: 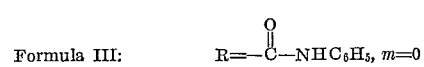 $m=0$

To a solution of 0.50 g. of 13,14-diazatricyclo- [6.4.1.1$^{2,7}$]tetradecane in 2 ml. of carbon tetrachloride was added 1.30 ml. of a 50% solution of phenyl isocyanate in carbon tetrachloride. The resulting white precipitate (1.05 g., 94%) was purified by extraction with ethanol in a Soxhlet apparatus to yield a white powder, M.P. 374–375° C. dec.

Analysis.—Calcd. for C$_{26}$H$_{32}$N$_4$O$_2$: C, 72.19; H, 7.46; N, 12.95; M.W., 432.55. Found: C, 72.12, 72.06; H, 7.48, 7.55; N, 13.08, 13.20; M.W., 432 (mass spectrum).

IR: $\nu_{max}^{KBr}$ 3320 cm.$^{-1}$ (s.) (NH); 3060 cm.$^{-1}$ (w.) (C$_6$H$_5$); 2930, 2860 cm.$^{-1}$ (w) (CH); 1640, 1595, 1530, 1505, 1440 cm.$^{-1}$ (m.-s.) (C$_6$H$_5$NHCO)

UV: $\lambda_{max.}^{C_2H_5OH}$ 243 m$\mu$ ($\epsilon$=41,500)

EXAMPLE 17.—13,14 - DIMETHYL - 13,14 - DIAZATRICHLO[6.4.1.1$^{2,7}$] - TETRADECA - 3,5,9,11-TETRAENE

Formula II: R=—CH$_3$, $m=0$ 13,14 - diazatricyclo[6.4.1.1$^{2,7}$]tetradeca - 3,5,9,11-tetraene (0.50 g.) and methyl iodide (5 ml.) were sealed in a tube and heated at 100° C. overnight. The contents of the tube were washed out with 20 ml. of methanol and evaporated to dryness to leave a brown crystalline residue (0.68 g.). This material was dissolved in water, the solution filtered, and the filtrate basified with 30% sodium hydroxide. The crude product weighed 0.171 g. (30% yield). Two recrystallizations from aqueous methanol followed by sublimation at 100° C./0.1 mm. gave pure crystalline 13,14-dimethyl-13,14-diazatricyclo[6.4.1.1$^{2,7}$]-tetradeca - 3,5,9,11 - tetraene, M.P. 166.5–168° C. dec. (sealed capillary).

Analysis.—Calcd. for C$_{14}$H$_{18}$N$_2$: C, 78.46; H, 8.47; N, 13.07; M.W., 214.30. Found: C, 78.60; H, 8.56; N, 13.09; M.W., 214 (mass spectrum).

IR: $\nu_{max}^{KBr}$ 3060, 3015 cm.$^{-1}$ (w.-m.) (CH=CH); 3000, 2965, 2930, 2910, 2875, 2850, 2815, 2780 cm.$^{-1}$ (m.) (CH, NCH$_3$); 1450 cm.$^{-1}$ (s.) 1180, 1170 cm.$^{-1}$ (s.)

UV: $\lambda_{max.}^{CH_3OH}$ 237 m$\mu$ ($\epsilon$=14,100); 230 m$\mu$ ($\epsilon$ 13,900)

NMR (hydrochloride in D$_2$O):

$\tau$=3.39 (d, J=4 c./s.) 3.57 (t, J=4 c./s.), 4 CH=CH protons 391 (m.) 4 CH–CH protons; 521 (s.) N–H exchange peak+2 bridgehead protons; 5.34 (s.) 2 bridgehead protons; 7.08 (s.) 6 N–CH$_3$ protons MS: m./e. 214 (parent), 107 (1/2 parent), 94, 92 (1/2 parent–CH$_3$), 81, 66, 65, 51, 43, 42, 39, 27, 15

Raman: strong band at 1615 cm.$^{-1}$

Dipole Moment: 0.57D. On the basis of this measurement, the compound is indicated to have the trans stereoisomeric form (cf. Formula IIb).

EXAMPLE 18.—13,14-DIMETHYL-13,14-DIAZATRICYCLO[6.4.1.1$^{2,7}$]TETRADECANE

Formula III: R=CH$_3$, $m=0$ 13,14-diazatricyclo[6.4.1.1$^{2,7}$]tetradecane (0.47 g.) was sealed in a tube with methyl iodide (5 ml.) and heated at 100° C. for one hour. The contents of the tube were rinsed out with methanol and water, and the extracts were evaporated to dryness to yield 0.96 g. of yellow-white solid. This product was dissolved in 20 ml. of water and treated with 30% sodium hydroxide. The white crystalline precipitate obtained weighed 0.30 g. and was purified by sublimation at 90° C./0.1 mm. The colorless crystals of pure 13,14-dimethyl-13,14 - diazatricyclo[6.4.1.1$^{2,7}$]tetradecane weighed 0.236 g. (44%), M.P. 95–96° C. (sealed capillary).

Analysis.—Calcd. for C$_{14}$H$_{26}$N$_2$: C,75.61; H, 11.79; N, 12.60; M.W., 222.36. Found: C, 74.76; H, 11.82; N, 12.75; M.W., 222 (mass spectrum).

IR: $\nu_{max}^{KBr}$ 2920, 2860, 2780 cm.$^{-1}$ (w.-s.) (CH, NCH$_3$); 1400 cm.$^{-1}$ (s.); 1180 cm.$^{-1}$ (s.)

UV: no $\lambda_{max.}^{C_2H_5OH}$ between 200–400 m$\mu$

NMR (CCl$_4$):

$\tau$=7.37 (s.) 4 bridgehead protons; 7.44 (s.) 6 NCH$_3$ protons; 8.41 (bm.) 16 CH$_2$ protons MS: m./e. 222 (parent), 207 (parent–CH$_3$), 165, 112 (1/2 parent+H), 110, 96, 83, 70, 58, 42, 28, 15 (CH$_3$)

EXAMPLE 19.—PREPARATION OF A COPOLYMER BETWEEN 13,14 - DIAZATRICYCLO[6.4.1.1$^{2,7}$] TETRADECA-3,5,9,11 - TETRAENE AND ADIPIC ACID

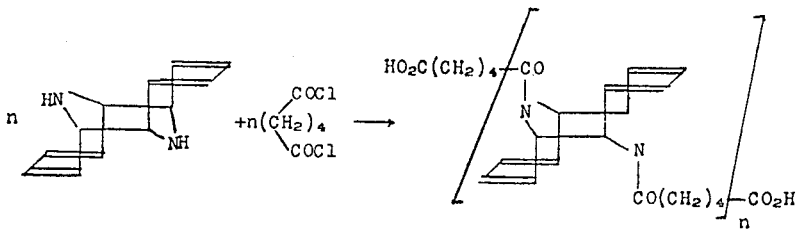

13,14-diazatricyclo[6.4.1.1$^{2,7}$]tetradeca-3,5,9,11 - tetraene (0.27 g.) was suspended in a mixture of dichloromethane (10 ml.), water (40 ml.) and sodium hydroxide (0.12 g.) in a 300-ml. tall-form beaker. This mixture was agitated with a high-speed stirrer and treated at once with adipoyl chloride (0.25 g.). After 10 minutes' stirring, the liquid was boiled for 5 minutes to remove dichloromethane, and then it was cooled to 0° C. and filtered to remove the white polymeric suspension. The residue was washed thoroughly with water and dried to a white powder (0.46 g., 100%), M.P. >330° C. It was soluble in tetrafluorodichloroacetone hydrate and in trifluoroacetic acid.

*Analysis.*— Calcd. for $(C_{18}N_{20}N_2O_2)_n$: C, 72.95; H, 6.80; N, 9.45. Found: C, 69.10, 69.25; H, 6.86, 6.94; N, 8.59, 8.76.

IR: $\nu_{max.}^{Nujol}$ 3500 cm.$^{-1}$ (b.w.) (NH, CO$_2$H); 3030 cm.$^{-1}$ (w.) (CH=CH); 1720 cm.$^{-1}$ (w.) (CO$_2$H); 1630 cm.$^{-1}$ (v.s.) (NCOR); 750 cm.$^{-1}$ (s.) (C=C)
NMR (CF$_2$ClCOCF$_2$Cl·D$_2$O):
$\tau$=4.03 8 vinyl protons; 5.50 exchange signal HDO; 7.58 4 CH$_2$ protons adjacent to C=O; 8.33 4 CH$_2$ protons remote from C=O The method of Example 19 was employed to make additional polymers from 1.0 g. of 13,14-diazatricyclo-[6.4.1.1$^{2,7}$] tetradeca-3,5,9,11-tetraene and 1.0 g. of various diacid chlorides[A(COCl)$_2$]. Data for these preparations are given in the following table:

tle and that from 19c being flexible. A film from 19c (0.0036" thick) showed the following properties.
Refractive Index: 1.57
Resistivity: >10$^{15}$ ohm. cm.
Tensile strength:
7360 lb., 4.4% elongation at break
5240 lb., 3.0% elongation at break
7160 lb., 4.5% elongation at break
Stiffness:
172,000 lb./in.$^2$
160,000 lb./in.$^2$ EXAMPLE 20.—PREPARATION OF A COPOLYMER BETWEEN 13,15-DIAZATRICYCLO[6.4.1.1$^{2,7}$]TETRADECANE AND ADIPIC ACID

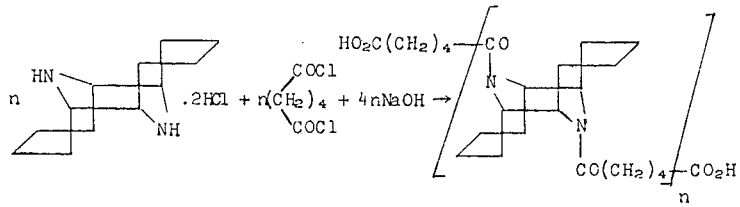

13,14 - diazatricyclo[6.4.1.1$^{2,7}$]tetradecane hydrochloride (0.53 g) was suspended in a mixture of dichloromethane (10 ml.) and water (40 ml.), stirred rapidly, and treated in succession with sodium hydroxide (0.32 g.) and adipoyl chloride (0.36). The white powdery polymer was isolated as described in Example 19 (80 mg.), M.P. >315° C. dec.

*Analysis.*—Calcd. for $(C_{18}H_{28}N_2O_2)$n: C, 71.01; H, 9.27; N, 9.20. Found: C, 66.33, 66.34; H, 8.73, 8.79; N, 9.43, 9.28.

IR: $\nu_{max}^{KBr}$ 3450 cm.$^{-1}$ (m.) (NH, CO$_2$H); 2940, 2860 (w.) (CH); 1740 cm.$^{-1}$ (v.w.) (CO$_2$H); 1640 cm.$^{-1}$ (v.s.) (NCOR)

The method of Example 19 was employed to make

| | | | Polymer | | | | |
|---|---|---|---|---|---|---|---|
| | | | Anal., percent | | | I.R., cm.$^{-1}$ | NMR, $\tau$, | Inh. visc., CF$_3$CO$_2$H, 0.25%, |
| | A(COCl)$_2$ | M.P., °C. | C | H | N | KBr, $\nu$ max. | CF$_3$CO$_2$H | 25° C. |
| Example: | | | | | | | | |
| 19a | Adipoyl chloride | 248 | 70.61 | 7.13 | 8.93 | 3,050 | 4.37 | 0.26 |
| | | | 70.66 | 7.31 | 8.81 | 1,721 | 4.80 | |
| | | | | | | 1,645 | 5.52 | |
| | | | | | | | 7.81 | |
| | | | | | | | 8.70 | |
| 19b | Suberoyl chloride | 230 | 71.24 | 7.52 | 7.86 | 3,050 | 4.32 | Insoluble |
| | | | 71.36 | 7.87 | 7.89 | 1,730 | 4.75 | |
| | | | | | | 1,650 | 5.46 | |
| | | | | | | | 7.73 | |
| | | | | | | | 8.93 | |
| 19c | Sebacoyl chloride | 148–150 | 72.42 | 8.29 | 7.55 | 3,030 | 4.28 | 0.66 |
| | | | 72.54 | 8.34 | 7.62 | 1,650 | 4.74 | |
| | | | | | | | 5.45 | |
| | | | | | | | 7.71 | |
| | | | | | | | 8.99 | |
| 19d | Ethylene glycol bis-chloroformate | 100–105 | 58.91 | 5.48 | 7.67 | 3,030 | 4.41 | 0.09 |
| | | | 58.87 | 5.36 | 7.62 | 1,710 | 5.37 | |
| | | | | | | | 5.93 | |

NOTE.—The polymers of 19, 19a, 19b and 19c are polyamides. That of 19d is a polyurethane.

The polymers of Examples 19b, 19c and 19d were pressed into films at a pressure of 500 p.s.i. and temperatures near their melting points. The films were self-supporting, those from 19b and 19d being somewhat brittle additional polymers from 1.0 g. of 13,14-diazatricyclo-[6.4.1.1$^{2,7}$]tetradecane and 1.0 g. of various diacid chlorides [A(COCl)$_2$]. Data for these preparations are given in the following table.

| A(COCl)₂ | M.P., °C | Polymer Anal., percent | | | I.R., cm.⁻¹, KBr, ν max. | —MR, τ, CF₃CO₂H | Inh. visc., CF₃CO₂H, 0.25%, 25° C. |
|---|---|---|---|---|---|---|---|
| | | C | H | N | | | |
| Example: | | | | | | | |
| 20a ....... Adipoyl chloride ............ | >305 | 70.21  69.70 | 9.49  9.45 | 9.14  8.83 | 2,910  1,640  1,430 | 5.34  6.02  7.45  8.50  8.77 | 0.38 |
| 20b ....... Suberoyl chloride ........... | 184–185 | 70.04  70.42 | 9.08  9.01 | 8.28  8.28 | 2,910  1,640  1,450 | 5.41  6.02  7.59  8.78 | 0.64 |
| 20c ....... Subacoyl chloride ........... | 69–71 | 72.31  72.26 | 9.79  9.79 | 8.64  8.58 | 2,940  1,640  1,450 | 5.40  6.05  7.60  8.87 | 0.23 |
| 20d ....... Ethylene glycol bis-chloroformate ... | 105–110 | 58.1  58.06 | 7.33  7.41 | 8.24  8.21 | 2,940  1,695  1,430 | 5.54  5.76  8.50 | 0.09 |

NOTE.—The polymers of 20, 20a, 20b, and 20c are polyamides. That of 20d is a polyurethane.

The polymers of Examples 20a, 20b, 20c and 20d were pressed into films at a pressure of 500 p.s.i. and temperatures near their melting points. The films were all self-supporting though somewhat brittle. A film from 20b (0.0036" thick) showed the following properties:

Refractive Index: 1.548
Resistivity: 4×10¹⁷ ohm. cm.
Tensile strength:
    5490 lb., 45% elongation at break
    5510 lb., 41.3% elongation at break
    4440 lb., 36% elongation at break
Stiffness:
    147,000 lb./in.²
    123,900 lb./in.²

EXAMPLE 21.—PREPARATION OF 13,14 - DIAZATRICYCLO[6.4.1.1$^{2,7}$]TETRADECA - 3,5,9,11-TETRAENE DIHYDROCHLORIDE 13,14 - diazatricyclo[6.4.1.1$^{2,7}$]tetradeca-3,5,9,11-tetraene (2.25 g.) was suspended in acetone (20 ml.) and treated with concentrated hydrochloride acid (3.2 ml.). The mixture was cooled to 0° C. and filtered. The residue was washed with acetone (100 ml.) and air-dried to a white powder (2.03 g., 65%). It was purified by reprecipitation from 1% hydrochloric acid with acetone (1.43 g., 78% recovery), M.P. >300° C. dec.

Analysis.—Calcd. for C₁₂H₁₆N₂Cl₂: C, 55.60; H, 6.22; N, 10.81. Found: C, 55.92, 56.10, 55.88; H, 6.56, 6.10, 6.38; N, 11.19, 11.16.

IR: $\nu_{max.}^{KBr}$ 2850, 2680 cm.⁻¹ (w.) (CH, NH₂⁺) 1630 cm.⁻¹ (w.) (CH=CH); 1550 cm.⁻¹ (s.) (NH₂⁺)
UV: $\lambda_{max.}^{H_2O}$ 235 mμ (ε=16,400); 230 mμ (ε=16,600)
NMR (D₂O): τ=3.59 complex multiplet 8 CH=CH proton; 5.10 HOD exchange protons+4 CH—N protons EXAMPLE 22.—13,14-DINITROSO - 13,14 - DIAZATRICYCLO[6.4.1.1$^{2,7}$]-TETRADECA - 3,5,9,11-TETRAENE Formula II: R=NO, m=0

A mixture of 13,14-diazatricyclo[6.4.1.1$^{2,7}$]tetradeca-3,5,9,11-tetraene (1.86 g.), water (10 ml.) and conc. hydrochloric acid (3.3 ml.) was stirred at 0° C. and treated gradually with a solution of sodium nitrite (1.52 g.) in water (5 ml.). After 1½ hours' stirring at 0° C. the mixture was filtered to yield the crude nitroso-compound as a brown powder (3.47 g.). Pure 13,14-dinitroso-13,14 - diazatricyclo[6.4.1.1$^{2,7}$]tetradeca - 3,5,9,11 - tetraene was obtained by two recrystallizations of 0.30 g. of this product from 80 ml. of ethanol. The product, 0.12 g. of golden needles, M.P. >250° C. dec., was dried at 25° C./0.1 mm.

Analysis.—Calcd. for C₁₂H₁₂N₄O₂: C, 59.01; H, 4.95; N, 22.94. Found: C, 59.07, 59.02; H, 5.03, 5.14; N, 22.56, 22.72.

UV: $\lambda_{max.}^{CH_3CN}$ 375 mμ (shoulder) (ε=172); 365 mμ (ε=142); 235 mμ (ε=19,000)
NMR [(CD₃)₂SO]; τ=4.18 (s.) 8 (CH=CH) protons; 4.30 (m.) 4 3° (CHN) protons

EXAMPLE 23.—13,14-DINITROSO-13,14-DIAZATRICYCLO[6.4.1.1$^{2,7}$]TETRADECANE

Formula III: R=NO, m=0

In a substantial repetition of the process of Example 22, a solution of 13,14 - diazatricyclo[6.4.1.1$^{2,7}$]tetradecane (2.87 g.) in water (40 ml.) and concentrated hydrochloric acid (4.0 ml.) was treated with a solution of sodium nitrite (2.25 g.) in water (10 ml.) at 0° C. The crude yellow precipitate produced weighed 3.44 g. (92%). Two recrystallizations of 0.86 g. of this compound from a mixture of ethanol (8 ml.) and water (5 ml.) gave pure 13,14 - dinitroso - 13,14 - diazatricyclo [6.4.1.1$^{2,7}$]tetradecane (0.66 g.), pale yellow crystals, M.P. 180–182.5° C. dec.

Analysis.—Calcd. for C₁₂H₂₀N₄O₂: C, 57.11; H, 7.99; N, 22.21. Found: C, 57.32, 57.17; H, 7.79, 7.68; N, 22.24, 22.12.

IR: $\nu_{max.}^{KBr}$ 2920, 2850, (CH); 1460, 1450, 1430, 1370, 1355 (N—NO, CH)

UV: $\lambda_{max.}^{C_2H_5OH}$ 363 mμ (ε=153); 355 (shoulder)(ε=146); 248 (ε=12,300)
NMR (CDCl₃):
τ=4.89 (m.) 4 3° (CHN) protons; 8.60 (m.) 16 CH² protons EXAMPLE 24.—13,14-BIS(ETHOXYCARBONYL)-13,14 - DIAZATRICYCLO[6.4.1.1$^{2,7}$]TETRADECA - 3,5,9,11-TETRAENE Formula II: R=—$\overset{\overset{\displaystyle O}{\|}}{C}$—OC₂H₅, m=0

A suspension of 13,14 - diazatricyclo[6.4.1.1$^{2,7}$]tetradeca-3,5,9,11-tetraene (7.44 g.) and anhydrous sodium carbonate (4.14 g.) in ether (70 ml.) was treated dropwise with a solution of ethyl chloroformate (8.50 g.) in ether (100 ml.). After stirring for 6 hours, the mixture was allowed to stand overnight, evaporated to dryness, stirred with about 20 ml. of water and filtered. The pale yellow precipitate was recrystallized from ethanol (120 ml.) to yield 7.72 g. (59%) of crystalline 13,14-bis(ethoxycarbonyl) - 13,14 - diazatricyclo[6.4.1.1$^{2,7}$]tetradeca-3,5,9,11-tetraene, M.P. 196.5–197.5° C. after drying at 100° C./0.1 mm.

*Analysis.*—Calcd. for $C_{18}H_{22}N_2O_4$: C, 65.44; H, 6.71; N, 8.48; M.W. 330.37. Found: C, 65.39, 65.66; H, 6.52, 6.54; N, 8.65; M.W. 330 (mass spectrum).

IR: $\nu_{max.}^{KBr}$ 3070, 3030 cm.$^{-1}$ (CH=CH); 2980, 2960, 2940, 2930, 2915, 2870 cm.$^{-1}$ (CH); 1700 cm.$^{-1}$(NCO$_2$C$_2$H$_5$); 1650 cm.$^{-1}$ (C=C)

UV: $\lambda_{max.}^{CH_3CN}$ 237 m$\mu$ ($\epsilon$=14,200); 232 m$\mu$ ($\epsilon$=13,750)

NMR (CDCl$_3$): $\tau$=4.12 (b.s.) 8 (CH=CH) protons; 5.14 (m.) 4 (CHN) protons; 5.90 (q., J=7) 4 (OCH$_2$) protons; 8.82 (t., J=7) 6 CH$_3$ protons MS: m./e. 330 (parent), 166, 165 (½ parent), 152, 137, 130, 128, 118, 117, 115, 108, 106, 105, 104, 103, 93, 92 (base peak), 80, 66, 65, 29, 28.

Diazatricyclotetradecatetraenedicarbonitriles of this invention (Formula IIa or Formula II with R=CN) can be made known from aromatic compounds through the sequence of conversion to N-cyanoazepine dimers by the method of the above-mentioned Marsh patent, i.e. by reaction of the aromatic compound with cyanogen azide, and rearrangement of such dimers as illustrated in the foregoing Examples 1 and 2. The N-cyanoazepine dimers are identified specifically as substituted 1H-azepine-1-carbonitrile dimers having the Formula I, supra, and compounds of the invention obtained from such dimers are identified as substituted 13,14-diazatricyclo[6.4.1.1$^{2,7}$] tetradeca-3,5,9,11-tetraene - 13,14 - dicarbonitriles having the Formula IIa, supra. The compound of Formula IIa where X is fluorine and $m$=1, for example, can be obtained by the following procedure: A solution of cyanogen azide in excess fluorobenzene is heated at about 60° C. until an equivalent of nitrogen has evolved (ca. four hours). The product is a solution of monomeric fluoro-1H-azepine-1-carbonitrile and its dimer in excess fluorobenzene, from which the fluorobenzene and the monomeric product are removed by molecular distillation at room temperature. The distillation residue is slowly added with stirring to approximately five times its volume of naphthalene preheated to 140° C., and the mixture is then heated further to a temperature of about 200° C. for half an hour. Dilution of the naphthalene mixture with excess benzene and filtration at about 60° C. yields the product (i.e., difluoro - 13,14 - diazatricyclo[6.4.1.1$^{2,7}$]tetradeca-3,5,9,11-tetraene-13,14-dicarbonitrile).

In Table A, which follows, are given aromatic compounds in the first column and $X_m$ substituents in the second column to designate corresponding dimers of Formula I and product compounds of Formula IIa. It will be understood that Table A thus identifies specific representative compounds of the invention obtainable by the above-described sequence of aromatic compound to $X_m$-1H-azepine-1-carbonitrile dimer to di$X_m$-13,14-diazatricyclo[6.4.1.1$^{2,7}$]tetradeca - 3,5,9,11 - tetraene - 13,14-dicarbonitrile.

TABLE A

| Aromatic Compound | $X_{(m)}$ |
|---|---|
| Fluorobenzene | Fluoro$_{(1)}$ |
| Chlorobenzene | Chloro$_{(1)}$ |
| (2-chloroethyl)benzene | 2-Chloroethyl$_{(1)}$ |

TABLE A (Continued)

| Aromatic Compound | $X_{(m)}$ |
|---|---|
| (Difluoromethyl)benzene | Difluoromethyl$_{(1)}$ |
| (Trifluoromethyl)benzene | Trifluoromethyl$_{(1)}$ |
| (Trichloromethyl)benzene | Trichloromethyl$_{(1)}$ |
| Benzonitrile | Cyano$_{(1)}$ |
| Nitrobenzene | Nitro$_{(1)}$ |
| Methyl benzoate | Methoxycarbonyl$_{(1)}$ |
| n-Hexyl benzoate | n-Hexyloxycarbonyl$_{(1)}$ |
| o-Difluorobenzene | Fluoro$_{(2)}$ |
| p-Dichlorobenzene | Chloro$_{(2)}$ |
| Ethyl p-fluorobenzoate | Fluoro$_{(1)}$; Ethoxycarbonyl$_{(1)}$ |
| m-Chloronitrobenzene | Chloro$_{(1)}$; Nitro$_{(1)}$ |
| 1,4-bis(trifluoromethyl) benzene | Trifluoromethyl$_{(2)}$ |
| Hexafluorobenzene | Fluoro$_{(6)}$ |

Additional representative diazatricyclotetradecatetraenes of this invention obtainable by methods described in Examples 3–9, 14, 17, 19, 22 and 24 are presented in Table B. In this table, precursors with variations in $X_m$ corresponding to Formula II are shown in the first column. In the second column are shown corresponding products of Formula II with variations in the substituent R; and in the third column the methods of obtaining said products are identified by reference to appropriate examples.

As a specific example, the compound of Formula IIe (a diamine of Formula II, R=H) where X=fluorine and $m$=6 can be obtained by prolonged (20 to 24 hours) hydrolysis of dodecafluoro-13,14-diazatricyclo[6.4.1.1$^{2,7}$] tetradeca-3,5,9,11-tetraene-13,14-dicarbonitrile (Formula IIa, X=fluorine, $m$=6) in 50% sulfuric acid at 100° C. Hydrolysis of this dicarbonitrile for a shorter time (4 to 10 hours) will yield dodecafluoro-13,14-diazatricyclo [6.4.1.1$^{2,7}$]tetradeca-3,5,9,11 - tetraene - 13,14 - dicarbonamide (Formula II,

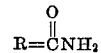

X=fluorine, $m$=6). As a further specific example, the compound of Formula II, where R=phenylcarbamoyl, X=trifluoromethyl, and $m$=2, can be obtained from the corresponding diamine (Formula IIe, X=trifluoromethyl, $m$=2) by reaction with phenyl isocyanate. The foregoing compounds of the invention are, of course, derivable from corresponding intermediate 1H-azepine-1-carbonitrile dimers which can be prepared initially from cyanogen azide and hexafluorobenzene or bis(trifluoromethyl) benzene, respectively.

TABLE B

| Formula II; R=H; $X_m$ | Substituent R of Formula II | Example |
|---|---|---|
| Fluoro(1) | Carbamoyl | 3, 4 |
| (2-chlorobutyl)(1) | do | 3, 4 |
| Nitro(1) | do | 3, 4 |
| Fluoro(6) | do | 3, 4 |
| Chloro(2) | Hydrogen | 5, 6 |
| Methoxycarbonyl(1) | Isopropyl | 17 |
| -(0) | n-Octyl | 17 |
| -(0) | Benzyl | 17 |
| Fluoro(1) | β-Naphthylcarbamoyl | 14 |
| -(0) | n-Butylcarbamoyl | 14 |
| -(0) | p-Methylbenzoyl | 7, 8 |
| -(0) | Hexanecarbonyl | 7, 8, 19 |
| Fluoro(6) | p-Chlorophenylthiocarbamoyl | 9 |
| Chloro(1) | Ethylthiocarbamoyl | 9 |
| Nitro(1) | Nitroso | 22 |
|  | Phenoxycarbonyl | 24 |

Representative diazatricyclotetradecanes of the invention obtainable by methods illustrated in Examples 10–13, 15, 16, 18, 20 and 23 are shown in Table C. In this table, precursors of Formula III (R=H) with variations in $Y_m$ are shown in the first column. Corresponding products of Formula IV with variations in the substituent R are shown in the second column, and methods of obtaining said products are identified in the third column by reference to applicable examples.

As a specific example, the diazatricyclotetradecane of Formula III, where Y=trichloromethyl and $m$=1 (bis-trichloromethyl - 13,14 - diazatricyclo[6.4.1.1$^{2,7}$]tetradecane) can be obtained from the initial starting materials benzotrichloride and cyanogen azide. The intermediate monomeric trichloromethyl-1H-azepine-1-carbonitrile obtained as a red oil dimerizes spontaneously on standing at room temperature. The resulting crystalline dimer can be converted to the compound of Formula IIa (X=trichloromethyl, $m=1$) by heating a uniform mixture of it in a large volume of sodium chloride (table salt) at about 250° C. in a continuous-flow manner such that the mixture is subjected to heat for 10–20 minutes. The sodium chloride may be removed from the product by dissolution in water, followed by decantation or filtration. The bis - trichloromethyl - 13,14 - diazatricyclo[6.4.1.1$^{2,7}$]tetradeca-3,5,9,11-tetraene-13,14-dicarbonitrile (Formula IIa, X=trichloromethyl, $m=1$) thus isolated can be hydrolyzed to the corresponding diamine (Formula IIe, X=trichloromethyl, $m=1$) in about 80% aqueous p-toluene-sulfonic acid under reflux. Hydrogenation of the diamine (cf. Examples 10 and 11) yields bis-trichloromethyl-13,14-diazatricyclo[6.4.1.1$^{2,7}$]tetradecane. This aliphatically saturated diamine can be further converted to additional compounds of Formula III, e.g., by treatment with ethyl iodide to form the compound where R=ethyl, Y=trichloromethyl, and $m=1$, i.e., bis-trichloromethyl-13,14-diethyl-13,14-diazatricyclo[6.4.1.1$^{2,7}$]tetradecane.

TABLE C

| Formula III; R=H; Y$_m$ | Substituent R of Formula III | Example |
| --- | --- | --- |
| Chloromethyl(1) | Nitroso | 23 |
| Fluoro(1) | 2-phenylethyl | 18 |
| Fluoro(2) | Hydrogen | 10, 11 |
| Chloro(1) | o-Bromobenzoyl | 13 |
| Trifluoromethyl(1) | n-Butyl | 18 |
| -(0) | n-Hexyl | 18 |
| -(0) | Cyclohexylcarbamoyl | 16 |
| Methoxycarbonyl(1) | Acetyl | 13, 20 |
| -(0) | p-Tolythiocarbamoyl | 15 |
| -(0) | n-Butylthiocarbamoyl | 15 |
| -(0) | p-Chlorophenoxy carbonyl | 24 |
| β-Chloroethyl(1) | β-Chloroethoxy carbonyl | 24 |

All of the compounds of this invention melt with decomposition. The resultant gummy products are effective adhesives. For example, when the compounds of Examples 5 and 7 (Formula II: $m=0$; R=H and benzoyl, respectively) were placed between sheets of glass, decomposed thermally and cooled, the glass sheets were strongly cemented together.

Compounds of general Formula II all exhibit strong absorption ($\epsilon$=9000–32,000) in the 230–240 m$\mu$ region of the ultraviolet and can therefore be used in optical filter elements for removal of corresponding wavelengths of ultraviolet light. Absorption characteristics of certain of the compounds are shown in the following table:

| R | $\lambda_{max}$.(m$\mu$) | $\epsilon_{max}$ |
| --- | --- | --- |
| CN | 237 | 16,300 |
|  | 230 | 15,150 |
| CONH$_2$ | 234 | 9,450 |
| H | 240 | 15,800 |
|  | 234 | 16,400 |
| H as hydrochloride | 235 | 16,400 |
|  | 230 | 16,600 |
| C$_6$H$_5$CO | 235 | 21,300 |
| p-BrC$_6$H$_4$CO | 230 | 32,000 |
| CH$_3$ | 237 | 14,100 |
|  | 230 | 13,900 |

Compounds of general Formula II where R=cyano (Examples 1 and 2) and carbamoyl (Examples 3 and 4) are intermediates to the diazatricyclotetradecatetraenes where R=H (the diamine of Example 5). The tetradecatetraene diamine reacts with a dicarboxylic acid chloride, e.g., adipoyl chloride, to form a polyamide (Example 19). The tetradecatetraene diamine can be hydrogenated to the corresponding saturated diamine (Formula III, R=H, Examples 10 and 11), which can also be reacted with a dicarboxylic acid chloride to form a polyamide (Example 20).

The foregoing detailed description has been given for clearness of understanding only and no unnecessary limitations are to be understood therefrom. The invention is not limited to the exact details shown and described, for obvious modifications will occur to those skilled in the chemical arts.

The embodiments of the invention in which an exclusive property or privilege is claimed are defined as follows:

1. A compound of the group consisting of (I)

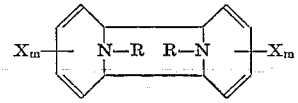

and (II)

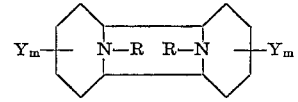

wherein:

R is selected from the group consisting of cyano, hydrogen, nitroso, alkyl, carbamoyl, alkyl- and arylcarbamoyl, alkyl- and arylthiocarbamoyl, alkyl-, aryl-, alkoxy- and aryloxycarbonyl and aralkyl, all alkyl being of 1–8 carbons and all aryl being hydrocarbon of 6–10 carbons;

$m$ is a number from 0 to 6, being a maximum of 2 when X is nitro;

X is selected from the group consisting of fluorine, chlorine, cyano, nitro, fluoro- and chloroalkyl of up to 8 carbons and alkoxycarbonyl of up to 9 carbons; and Y is selected from the group consisting of fluorine, chlorine, fluoro- and chloroalkyl of up to 8 carbons and alkoxycarbonyl of up to 9 carbons;

valences of carbon in the depicted rings not satisfied by a double bond or a named substituent being satisfied by hydrogen.

2. The compound of Formula I of claim 1 wherein R is cyano and $m$ is 0, 13,14-diazatricyclo[6.4.1.1$^{2,7}$]tetradeca-3,5,9,11-tetraene-13,14-dicarbonitrile.

3. The compound of Formula I of claim 1 wherein R is carbamoyl and $m$ is 0, 13,14-bis(carbamoyl)-13,14-diazatricyclo[6.4.1.1$^{2,7}$]tetradeca-3,5,9,11-tetraene.

4. The compound of Formula I of claim 1 wherein R is hydrogen and $m$ is 0, 13,14-diazatricyclo[6.4.1.1$^{2,7}$]tetradeca-3,5,9,11-tetraene.

5. The compound of Formula I of claim 1 wherein R is benzoyl and $m$ is 0, 13,14-dibenzoyl-13,14-diazatricyclo]6.4.1.1$^{2,7}$]tetradeca-3,5,9,11-tetraene.

6. The compound of Formula I of claim 1 wherein R is para-bromobenzoyl and $m$ is 0, 13,14-di-para-bromobenzoyl-13,14 - diazatricyclo[6.4.1.1$^{2,7}$]tetradeca - 3,5,9, 11-tetraene.

7. The compound of Formula I of claim 1 wherein R is phenylthiocarbamoyl and $m$ is 0, 13,14-bis(phenylthiocarbamoyl) - 13,14 - diazatricyclo[6.4.1.1$^{2,7}$]tetradeca-3,5,9,11-tetraene.

8. The compound of Formula II of claim 1 wherein R is hydrogen and $m$ is 0, 13,14-diazatricyclo[6.4.1.1$^{2,7}$]tetradecane.

9. The compound of Formula II of claim 1 wherein R is benzoyl and m is 0, 13,14-dibenzoyl-13,14-diazatricyclo[6.4.1.1²,⁷]tetradecane.

10. The compound of Formula I of claim 1 wherein R is phenylcarbamoyl and m is 0, 13,14-bis(phenylcarbamoyl) - 13,14 - diazatricyclo[6.4.1.1²,⁷]tetradeca-3,5,9,11-tetraene.

11. The compound of Formula II of claim 1 wherein R is phenylthiocarbamoyl and m is 0, 13,14-bis(phenylthiocarbamoyl) - 13,14 - diazatricyclo[6.4.1.1²,⁷]tetradecane.

12. The compound of Formula II of claim 1 wherein R is phenylcarbamoyl and m is 0, 13,14-bis(phenylcarbamoyl)-13,14-diazatricyclo[6.4.1.1²,⁷]tetradecane.

13. The compound of Formula I of claim 1 wherein R is methyl and m is 0, 13,14-dimethyl-13,14-diazatricyclo[6.4.1.1²,⁷]tetradeca-3,5,9,11-tetraene.

14. The compound of Formula II of claim 1 wherein R is methyl and m is 0, 13,14-dimethyl-13,14-diazatricyclo[6.4.1.1²,⁷]tetradecane.

15. The process of producing a 13,14-diazatricyclo[6.4.1.1²,⁷]tetradeca-3,5,9,11 - tetraene - 13,14 - dicarbonitrile of Formula I of claim 1 wherein R is cyano which comprises heating, at a temperature in the range 175° C. to 300° C. and in admixture with an inert diluent, a 1H-azepine-1-dicarbonitrile dimer of the formula

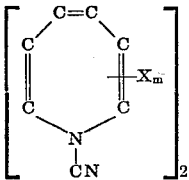

where:

m is a number from 0 to 6, being a maximum of 2 when X is nitro; and

X is selected from the group consisting of fluorine, chlorine, cyano, nitro, fluoro- and chloroalkyl of up to 8 carbons and alkoxycarbonyl of up to 9 carbons.

16. The process of claim 15 where m in the formula of the dimer is 0 and the diluent is naphthalene.

References Cited

UNITED STATES PATENTS

| | | | |
|---|---|---|---|
| 3,256,329 | 6/1966 | Kauer et al. | 260—268 X |
| 3,321,482 | 5/1967 | Paquette | 260—268 X |

OTHER REFERENCES

Johnson et al. Jour. Am. Chem. Soc., vol. 88, pp. 2591-3 (1966).

DONALD G. DAUS, Primary Examiner

U.S. Cl. X.R.

156—331; 252—300; 260—77.5, 78, 239, 453, 465, 476, 544, 593, 645, 646, 690

PO-1050
(5/69)

UNITED STATES PATENT OFFICE
CERTIFICATE OF CORRECTION

Patent No. 3,475,433           Dated October 28, 1969

Inventor(s)  Alexander L. Johnson

It is certified that error appears in the above-identified patent and that said Letters Patent are hereby corrected as shown below:

Column 2, line 35 correct the spelling of

--diazatricyclotetraenes--

Column 5, line 56 correct the spelling of

--tetradeca--

Column 12, line 2 change "trichlo" to

--tricyclo--

Column 16, in the table, the heading for the column next to the last on the right hand side, should read --NMR, $\tau$,--

Column 17, line 17 transpose the two words "known from" to

-- from known --

SIGNED AND
SEALED
MAY 26 1970

(SEAL)
Attest:

Edward M. Fletcher, Jr.
Attesting Officer

WILLIAM E. SCHUYLER, JR.
Commissioner of Patents